W. E. HOSCH, DEC'D.
A. M. HOSCH, ADMINISTRATRIX.
MEASURING OR COMPUTING MACHINE.
APPLICATION FILED DEC. 15, 1917.
1,323,862.
Patented Dec. 2, 1919.
3 SHEETS—SHEET 1.
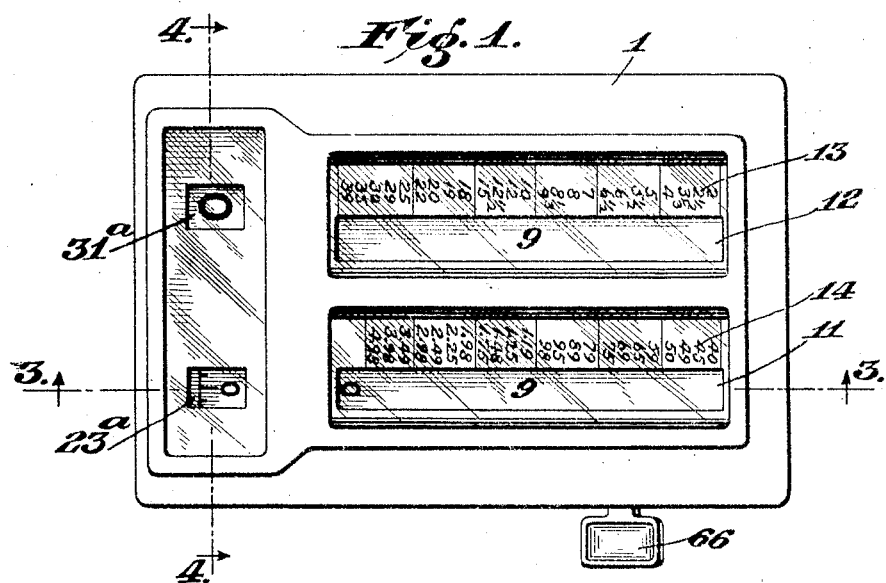
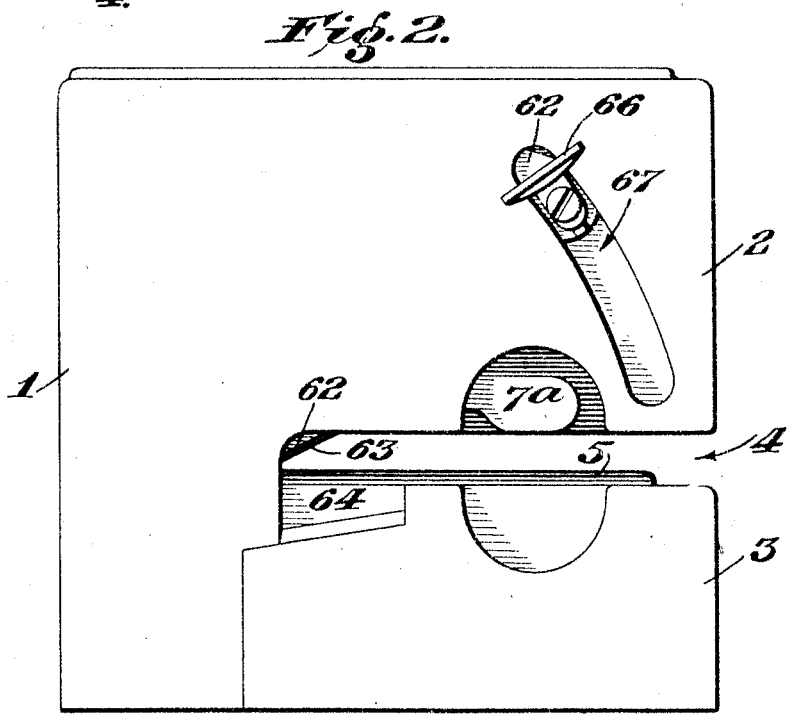
Inventor:
Walter E. Hosch,
By Bruce S. Elliott
his Atty.

W. E. HOSCH, DEC'D.
A. M. HOSCH, ADMINISTRATRIX.
MEASURING OR COMPUTING MACHINE.
APPLICATION FILED DEC. 15, 1917.
1,323,862.
Patented Dec. 2, 1919.
3 SHEETS—SHEET 2.
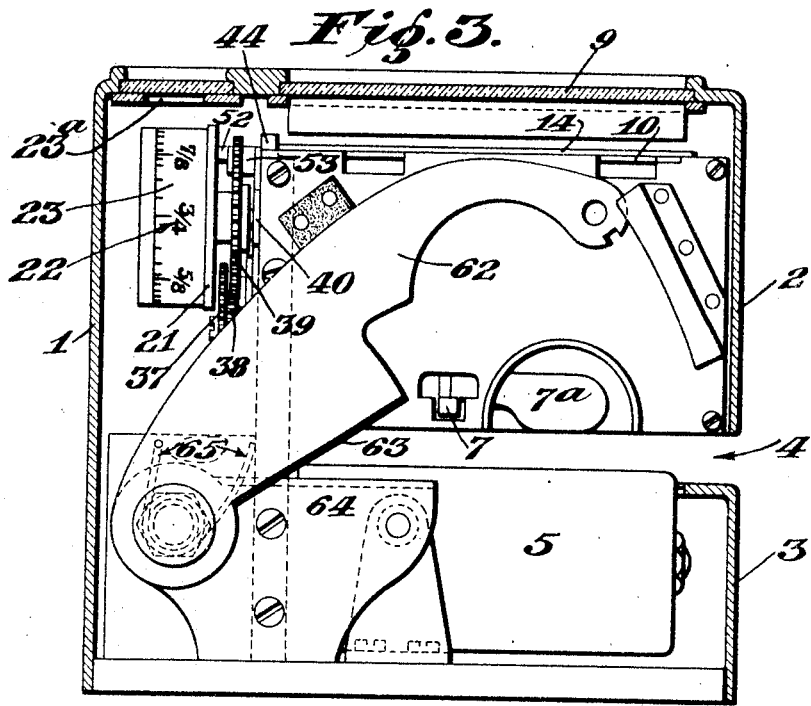
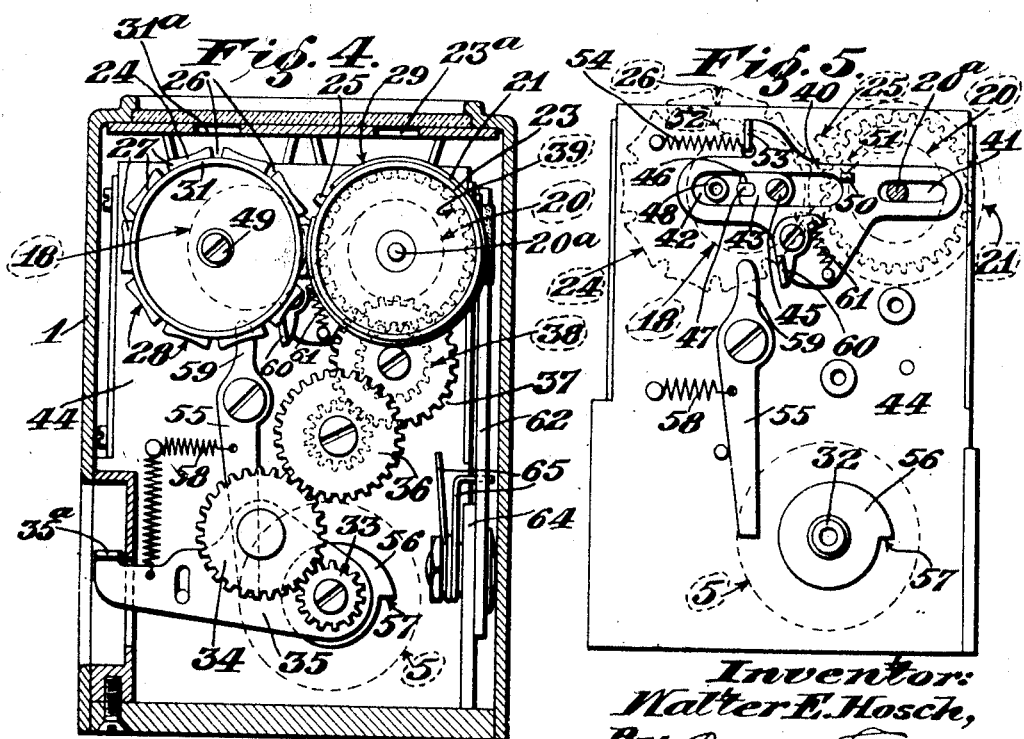

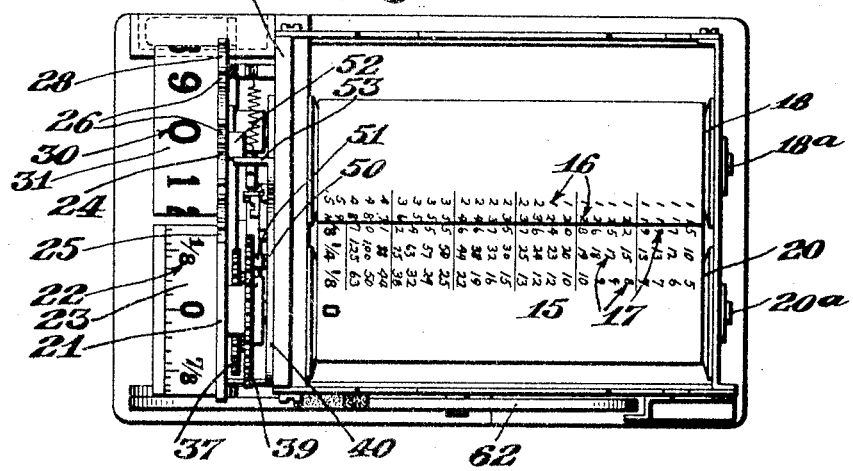
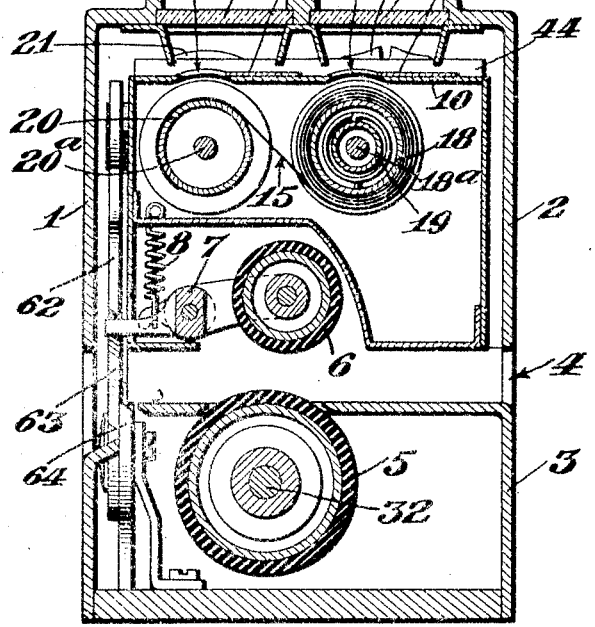
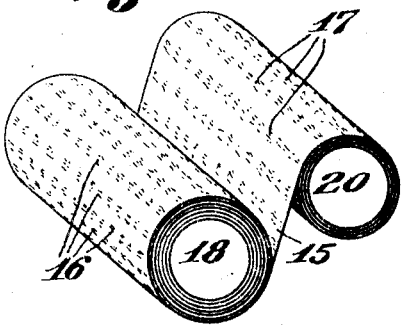

UNITED STATES PATENT OFFICE.

WALTER E. HOSCH, OF ST. LOUIS, MISSOURI; ANNIE MAE HOSCH, ADMINISTRATRIX OF SAID WALTER E. HOSCH, DECEASED, ASSIGNOR TO THE MEASUREGRAPH COMPANY, OF ST. LOUIS, MISSOURI, A CORPORATION OF MISSOURI.

MEASURING OR COMPUTING MACHINE.

1,323,862.  Specification of Letters Patent.  Patented Dec. 2, 1919.

Application filed December 15, 1917. Serial No. 207,229.

*To all whom it may concern:*

Be it known that I, WALTER E. HOSCH, a citizen of the United States, residing in the city of St. Louis and State of Missouri, have invented new and useful Improvements in Measuring or Computing Machines, of which the following is a specification.

This invention relates to a measuring or computing machine, the purpose of which is to indicate automatically the measurement or cost of goods; while features of my invention may be applied to measuring or computing machines of various types, in the present specification, for illustration, I have described the invention as applied to a type of instrument used by salesmen in selling piece goods of cloth, ribbon, laces or other materials.

The general object of the invention is to produce a very simple and compact machine, having a relatively large measuring or computing capacity. In the type of machine described, a web is provided, driven by a measuring roller, and bearing numbers which coöperate with a fixed scale; and one of the objects of my invention is to provide a web in which the numbers are so condensed as to enable me to use a relatively short web, at the same time enabling the machine to have a relatively great range in its indicating movement. I also provide very simple means for controlling the return of the indicating mechanism to its zero position after an indicating movement, and simple means for effecting the arrest of the measuring roller at the end of the indicating movement.

Further objects of the invention will appear hereinafter.

The invention consists in the general combination of parts and in the features to be described hereinafter, all of which contribute to produce an efficient measuring or computing machine.

In the drawing which fully illustrates a preferred embodiment of my invention.

Figure 1 is a plan of a complete machine of the type referred to above;

Fig. 2 is a side elevation;

Fig. 3 is a longitudinal vertical section through the casing of the instrument about on the line 3—3 of Fig. 1, the mechanism of the instrument being shown in elevation, with certain parts omitted;

Fig. 4 is a vertical cross section through the casing of the instrument taken about on the line 4—4 of Fig. 1, the mechanism of the instrument being shown in elevation;

Fig. 5 is a detail elevation of the mechanism similar to that shown in Fig. 4, but with the position of certain parts indicated in dotted lines;

Fig. 6 is a plan of the instrument with the cover removed;

Fig. 7 is a vertical cross section through the instrument;

Fig. 8 is a diagrammatic perspective of the indicating web.

Referring more particularly to the parts, the instrument comprises a casing 1 of substantially rectangular form, comprising an upper housing 2 and a lower housing 3, between which a gap or throat 4 is formed to enable the cloth or other material to be passed through the machine. In the lower housing 3 there is rotatably mounted a measuring roller 5 for driving the indicating mechanism of the instrument. Coöperating with the measuring roller 5, there is provided a presser-roller 6, (see Fig. 7) which is carried by a rocker frame 7. This rocker frame may be latched in an elevated position by any suitable mechanism, not illustrated in detail, as the same forms no part of the present invention. After the cloth is passed between the rollers 5 and 6 this rocker frame 7 may be unlatched by pressing thumb lever 7ª, and will then be pulled by its spring 8 so as to press the roller 6 down onto the goods and hold the same firmly against the face of the measuring roller. The thumb lever 7ª is accessible in a cavity in the casing. (See Fig. 2.)

In the upper housing 2 the indicating mechanism of the instrument is supported. For this purpose the upper side of the instrument is provided with transparent plates 9 under which there is held a face plate 10 (see Fig. 7), said face plate being provided with a pair of elongated slots or windows 11 and 12, and adjacent each window a fixed price scale is provided, the scale 13 adjacent the window 12 bearing lower numbers, and the scale 14 adjacent the window 11 bearing higher numbers. These numbers indicate prices per unit of measure of the goods, for example, prices per yard. Coöperating with these fixed scales I provide a web 15 (see Fig. 7), and I provide means for guiding and advancing this web so that it will present one of its faces adjacent one of the fixed scales and its opposite face adjacent to the other fixed scale; and I provide numbers 16 on one of the faces of the web and other numbers 17 on the other face; these numbers coöperate respectively with the price scales. When the indicating mechanism is in its zero position substantially all of this web is wrapped upon a drum 18 (see Fig. 7), said drum being provided with an internal coiled spring 19 which resists the rotation of the drum by the web when it is being drawn off and wrapped upon a take-up roller 20, thereby maintaining tension in the web. This spring is the means which I prefer to employ for returning the indicating mechanism to its zero position.

Wheels are provided with which are associated indicating means for indicating the number of yards and fractions thereof which have been passed over the measuring roller, while the numbers 16 and 17 indicate the cost of any predetermined number of yards as indicated on the scales 13 and 14. These wheels may be provided for this purpose with numbers on their faces so that they, themselves, constitute indicating wheels. The yard-fraction indicating wheel moves with and at the same speed as the take-up roller 20, while the other indicating wheel rotates at a slower rate, that is to say, it is preferably advanced through a partial revolution at the expiration of each complete revolution of the fraction indicating wheel. In order to accomplish this I provide the shaft 20$^a$ of the take-up roller with a wheel 21 (Fig. 3) which carries fractional numbers 22 preferably placed upon a number wheel 23 which is rigid with the wheel 21. These numbers indicate yard fractions ascending by eighths of a yard. Opposite the wheel 21 I provide a second wheel 24 which may be driven in any manner, but is preferably driven directly from the wheel 21 by a suitable interlocking connection, operating in such a way as to advance the wheel 24 with a step by step movement, the said wheel 24 being held against rotation between the moments of advance. For this purpose I prefer to employ the well known Geneva stop movement such as that indicated in Fig. 4, that is to say, I provide the wheel 21 with a tooth 25 which at each revolution engages with one of a plurality of coöperating notches or tooth spaces 26 on the wheel 24; between the tooth spaces 26 the periphery of the wheel 24 is formed into a plurality of enlarged teeth 27 with concave outer faces 28 which fit against the curved periphery 29 of the wheel 21 to lock the wheel 24 against rotation except at the moment that it is being advanced by the wheel 21. This wheel 24 carries numbers 30 (Fig. 6) preferably formed on a number wheel 31. These numbers 30 are in a series, such as 0, 1, 2, 3, etc., up to a number such as the number 9 corresponding to the limit or indicating capacity of the machine.

The numbers of the wheels 23 and 31 are visible through windows 23$^a$ and 31$^a$, (see Fig. 1). In order to drive the web, and the number wheels 23 and 31, from the measuring roller, I provide driving mechanism (see Fig. 4); this mechanism is preferably constructed so as to enable it to be disconnected when desired from the measuring roller to permit the spring 19 to return the indicating mechanism to its zero position. For this purpose the shaft 32 of the measuring roller carries a pinion 33 which meshes with a gear wheel 34 mounted on a shifting plate 35, and this gear wheel 34 normally meshes with a gear wheel 36 constituting part of a gear train 37 which multiplies the movement and rotates a driving pinion 38 which meshes with a gear wheel 39, rigid on the shaft 20$^a$ of the take-up roller. This gear wheel 39 is preferably formed as a disk rigid with and substantially constituting part of the aforesaid wheel 21.

I provide mechanism coöperating with the wheels 21 and 24 which operates in such a way as to hold the indicating mechanism normally in its zero position, but which is constructed in such a way as to permit the forward rotation of the wheels 21 and 24. For this purpose I provide a movable member 40 (Fig. 5) which is controlled by the wheel 24 and which is provided with detent means for stopping the fraction wheel 21 in its zero position in the return movement. This movable member and its relation to the wheels 21 and 24 is clearly shown in Fig. 5, it being understood, however, that the wheels 21 and 24 are actually located in front of the movable member 40 for which reason they are represented in dotted outlines. This movable member 40 is preferably in the form of a slide, one end of which is provided with a slot 41 guided on the shaft 20$^a$ of the take-up roller. The other end of the slide is provided with an enlarged slot 42 which is guided on a block 43 mounted on the face of a vertical frame plate 44 which supports all of these parts. This block 43 is held in place by a screw 45, and the edge of the block is provided with a notch 46, to engage over a rectangular neck 47 which forms an extension from the shaft 18$^a$ of the drum 18 thereby holding this shaft or arbor 18$^a$ fixed. I also provide a fixed stud 48 which projects outwardly from the plate 44 through the slot 42 and this stud forms a pivot for the wheel 24, the same being secured to the stud by a suitable screw 49.

The movable member 40 carries a detent 50, and the wheel 21, that is to say, its rigid counterpart, namely, gear wheel 39 coöperates with this detent in such a way that in the position of the movable member shown in Fig. 5, the detent stops or holds the wheel 21 in its zero position. Furthermore, the wheel 24 and the movable member coöperate in such a way that the wheel 24 normally holds the movable member in this position. For this purpose the wheel 39 (Fig. 6) is provided with a stop or stop-pin 51 adapted to engage the detent 50 during a backward rotation of the wheel 21. In addition to this, the wheel 24 is provided with a dog 52 (Figs. 5 and 6) which, when this wheel is in its zero position, engages one side of a projection 53 on the movable member 40. Now, it will be evident that when the machine commences to measure, just before the wheel 21 has completed one revolution its tooth 25 will engage with the wheel 24 and commence to rotate it in a left hand direction, as viewed in Fig. 5. This will cause the dog 52 to withdraw from the projection 53 and thereby permit the movable member 40 to shift toward the left. This shifting movement may be produced by any suitable means; for example, a spring 54. Evidently this spring will cause the projection 53 to follow the dog, and this movement will be sufficient to move the detent 50 out of the path of the stop 51; hence the wheel 21 may then make successive revolutions in a forward direction, that is to say, it may revolve continuously forward in the indicating movement.

After the operator of the machine has noted the amount of cloth measured and the charge to be made for the same, he disengages the indicating mechanism from the measuring roller by depressing the shifting plate 35 (Fig. 4). This he accomplishes simply by pressing down on the thumb-plate 35ª at the end of the shifting plate. The spring 19 of the drum 18 will then rotate the drum in a right hand direction to rewind the web upon it, and the web will rotate the take-up roller and the wheels 21 and 24 in a backward direction. During this return movement it will be evident that the wheel 24 will arrive at its zero position before the wheel 21 arrives at its zero position; now, when the wheel 24 arrives at its zero position the dog 52 engages the projection 53 and forces the movable member 40 toward the right as viewed in Fig. 5, extending the spring 54, and pushing the detent 50 into the path of the stop 51; in this way the detent 50 will stop the wheel 21 also in its zero position.

In order to prevent giving a shock to the indicating mechanism when the machine reaches the limit or measuring capacity of its indicating movement, I provide for directly arresting the rotation of the measuring roller, and I prefer to accomplish this through the agency of the wheel 24. This is most advantageously effected through the medium of the movable member or slide 40. For this purpose I provide a stop device in the form of a stop lever 55 (see Fig. 5), the lower end of which lies near the periphery of a stop disk 56 rigidly secured to the shaft 32 of the measuring roller, said disk having a shoulder 57 in its edge. The lever 55 is normally held away from the edge of the disk by a spring 58. The lever 55 also presents an upwardly extending short arm or tail 59 which may be engaged and actuated by the slide 40. This actuating engagement is preferably effected through the medium of a yielding connection comprising a pivoted rocking-toe 60 which is impelled in one direction by a spring 61 attached on the slide 40. When the dog 52 withdraws from the projection 53 in the commencement of an indicating movement, this rocking-toe 60 engages the lever 55, but as the spring 54 is relatively weak, the result is that the lever 55 simply stops the slide in this position without overcoming the spring 58 or moving the lever 55. But when the capacity of the machine has been reached in the indicating movement, the dog 52 will give the movable member a further movement and thereby actuate the lever 55 to stop the measuring roller. This further movement will be produced by reason of the fact that at the end of the indicating movement (if continued to the full capacity of the instrument,) the dog 52 will engage the projection 53 on its other side and give the slide 40 a further movement toward the left. In this connection, it should be understood that the spring 19 of the drum 18 is relatively strong, sufficiently so to overcome the spring 58, and hence when the slide is moved toward the left by the dog 52, the lever 55 will be moved over against the edge of the disk 56 and into the path of the shoulder 57, thereby arresting the measuring roller. The purpose of the yielding connection, including the spring 61, is to facilitate the coöperation of the slide with the lever 55 and the disk 56 and to enable the same to coöperate without a shock. For it will be evident that by reason of the spring 61 the lever 55 will be held against the edge of the disk 56 by yielding spring pressure and the cam-action of the edge of the disk 56 will not tend to produce any sliding movement in the plate 40. In other words, any movement of this kind will be absorbed by the flexible connection 60 and will not be imparted to the slide itself. To express this mode of operation in another way, it may be said that the dog 52 in shoving the projection 53 toward the left, effects an engagement between the rocking-toe 60, and the arm 59 of the stop lever, and at the same time extends the spring 61 so as to store up energy in it in such a way that the spring 61 thereafter operates to hold the lever 55 against the edge of the disk 56 until it stops the rotation of the disk and the measuring roller.

In order to mark the edge of the goods at the point where it is to be cut off after being measured, the machine is provided with a movable knife 62, (see Fig. 3) which is pivoted so that its cutting edge 63 will coöperate with a fixed blade or knife 64, and arranged in such a way that the blade 62 is normally held up by a spring 65. The cutting blade 62 may be depressed when desired by means of a thumb plate 66 carried by its outer end and projecting to the exterior through a curved slot 67 in the side of the case.

The general mode of operation of the complete machine will now be briefly stated.

When the cloth being measured is passed through the machine it rotates the measuring roller which is of a predetermined diameter, and this operates through the gear wheels 33 and 34 also to impart corresponding rotation to the shaft 20ᵃ of the take-up roller 20, rotating the take-up roller in a left hand direction, as viewed in Fig. 7, and thereby wrapping the web 15 onto the take-up roller and unwinding it from the drum 18 upon which the web is normally coiled. The web bears numbers on both of its faces so that as the web advances one of the faces of the web will be exposed adjacent to the scale 13 while the other is exposed adjacent the other fixed scale 14. As the measuring operation takes place, the number wheel 23 rotates with the take-up roller so as to indicate fractions of yards of the cloth passed through the machine. At each complete revolution of the number wheel 23 the number wheel 31 is advanced through a partial revolution so that this wheel operates to count the number of complete revolutions of the fraction wheel 23 and the web indicates whatever may be the cost of the number of yards and fractions of yards indicated, for the different rates indicated on the scales 13 and 14. Hence the machine simultaneously computes the cost of any length, the measurement of which it indicates.

In the position of the parts shown in Fig. 5, the pull of the drum spring 19 holds the stop 51 against the detent 50. When the indicating movement commences, the wheel 21 rotates in a right hand direction as viewed in Fig. 5 and before this wheel has made a complete revolution its tooth 25 rotates the wheel 24 in a left hand direction. As the wheel 24 rotates in this way the dog 52 moves with it, withdrawing from the projection 53 on slide 40, and causing the spring 54 to move slide 40 toward the left; this moves detent 50 out of the path of the stop 51 and permits the wheel 21 to make successive revolutions in a forward direction. The spring 54 will pull the slide 40 over until the rocking toe 60 strikes the arm 59 of lever 55 but it will not operate lever 55 because the spring 58 is stronger than the spring 54. When the desired amount of cloth has been measured and cut off, the operator then depresses shifting plate 35 (Fig. 4) which disengages the driving mechanism from the measuring roller. The drum-spring 19 then rotates the take-up roller in a reverse direction so as to wind the web from it back onto the take-up roller, and causing the wheel 21 to rotate backwardly, this backward rotation being communicated to the wheel 24. Just as the wheel 24 arrives at its zero position the dog 52 engages the projection 53 and moves the slide 40 toward the right so that the detent 50 comes into the path of the stop 51 thereby stopping and holding the wheel 21 and the web 15 in their zero positions.

At the limit of the measuring capacity of the machine the dog 52 will have moved around with wheel 24, and arrived at the right side of the projection 53, as viewed in Fig. 5, and then engages and moves the slide 40 toward the left. In this movement the rocking toe 60 actuates the lever 55 so as to move its end over against the disk 56 and into the path of shoulder 57, thereby stopping the rotation of the measuring roller.

It is understood that the embodiment of the invention described herein is only one of the many embodiments my invention may take.

What I claim is:

1. In a machine of the class described, the combination of a wheel mounted to make successive revolutions, a second wheel driven by said first named wheel through a partial revolution, at each revolution of said first named wheel, indicating means associated with said wheels, means for rotating said wheels backwardly to return the same to their zero position, a movable member having a detent adjacent said first named wheel, said first named wheel having a coöperating part to engage said detent to stop said first named wheel in its zero position in its return movement and means for controlling said movable member by said second named wheel to shift said detent out of the path of said coöperating part and thereby permit continuous forward revolutions of said first named wheel during the indicating movement.

2. In a machine of the class described, the combination of a wheel mounted to make successive revolutions, a second wheel mounted to be rotated through a partial revolution at each revolution of said first named wheel, indicating means controlled by said wheels, means for rotating said wheels backwardly to return the same to their zero position, a movable member having a detent for engaging said first named wheel to stop the same, said second named wheel having means operating when said second named wheel is in its zero position, to engage said movable member and hold the same with said detent in a position to stop said first named wheel in its zero position, and operating to permit a shifting movement of said movable member when said second named wheel moves away from its zero position and thereby shift said detent from its engagement with said first named wheel to permit continuous forward revolutions of said first named wheel.

3. In a machine of the class described, the combination of a wheel mounted to make successive revolutions, a second wheel mounted to be rotated through a partial revolution at each revolution of said first named wheel, indicating means controlled by said wheels, means for rotating said wheels backwardly to return the same to their zero position, said first named wheel having a stop thereupon, a slide having a detent for engaging said stop, to stop the said first named wheel in its zero position, a dog on said second named wheel, for engaging said slide when said second named wheel returns to its zero position to hold said detent in the path of said stop, and means for moving said slide when said second named wheel moves forwardly from its zero position to shift said detent out of the path of said stop and thereby permit continuous forward revolutions of said first named wheel.

4. In a measuring and computing machine, the combination of a wheel mounted to make successive revolutions, a second wheel driven by said first named wheel through a partial revolution at each revolution of said first named wheel, a measuring roller mounted to be rotated by the goods passed through said machine, means for driving said wheels from said measuring roller, indicating means controlled by said wheels, means for rotating said wheels backwardly to return the same to their zero position, a movable member having a detent adjacent said first named wheel, said first named wheel having a coöperating part to engage said detent to stop said first named wheel in its zero position, and means for controlling said movable member to shift said detent out of the path of said coöperating part when an indicating movement occurs, and thereby permit continuous forward revolutions of said first named wheel during the indicating movement.

5. In a measuring and computing machine, the combination of a wheel mounted to make successive revolutions, a second wheel mounted to be rotated through a partial revolution at each revolution of said first named wheel, indicating means controlled by said wheels, means for rotating said wheels backwardly to return the same to their zero position, a measuring roller mounted to be rotated by the goods passed through said machine, means for driving said wheels from said measuring roller, a slide having a detent, said first named wheel having a stop thereupon for engaging said detent to stop said first named wheel in its zero position in its return movement, a dog on said second named wheel for engaging said slide when said second named wheel returns to its zero position to move said detent into the path of said stop, and thereby stop said first named wheel in its zero position, and a spring for moving said slide in a direction to follow up said dog when said second named wheel rotates forwardly from its zero position, said spring operating to shift said detent out of the path of said stop to permit continuous forward revolutions of said first named wheel during the indicating movement.

6. In a measuring and computing machine, the combination of a measuring roller mounted so as to be rotated by the goods passed through the machine, a wheel mounted to make successive revolutions, a second wheel mounted to be rotated through a partial revolution, at each revolution of said first named wheel, means for driving said wheels by said measuring roller, indicating means controlled by said wheels, means for rotating said wheels backwardly to return the same to their zero position, a movable member having a detent for engaging said first named wheel when in the zero position, said second named wheel having means operating when it is in its zero position for engaging said movable member to hold said detent in a position to stop said first named wheel in its zero position, said second named wheel operating to permit a shifting movement of said movable member when said second named wheel rotates forwardly from its zero position, means for moving said movable member thereafter to shift said detent out of engagement with said first named wheel and thereby permit continuous forward revolutions of said first named wheel, and a stop-device controlled by said second named wheel for arresting said measuring roller at the limit of the indicating movement of the machine.

7. In a measuring and computing machine, the combination of a measuring roller mounted so as to be rotated by the goods passed through the machine, a wheel mounted to make successive revolutions, a second wheel mounted to be rotated through a partial revolution at each revolution of said first named wheel, means for driving said wheels by said measuring roller, indicating means controlled by said wheels, means for rotating said wheels backwardly to return them to their zero position, a movable member having a detent for engaging said first named wheel to stop the same at zero, said second named wheel having means for engaging said movable member for normally holding said movable member with said detent in a position to stop said first named wheel in its zero position in its return movement, said second named wheel operating to permit a shifting movement of said movable member when said second named wheel rotates forwardly from its zero position, means for moving said movable member thereafter to shift said detent from engagement with said first named wheel, and thereby permit continuous forward revolutions of said first named wheel, a stop member, means rotating with said measuring roller to coöperate with said stop-member to arrest said measuring roller, and means actuated by said second named wheel and said movable member for yieldingly moving said stop-member into engagement with said last named means to arrest the measuring roller at the limit of the indicating movement of the machine.

8. In a measuring and computing machine, the combination of a measuring roller mounted so as to be rotated by the goods passed through the machine, a wheel mounted to make successive revolutions, a second wheel 24 driven so as to rotate at a slower rate than said first named wheel, means for driving said wheels by said measuring roller, indicating means controlled by said wheels, means for rotating said wheels backwardly to return the same to their zero position, a movable member having a detent for engaging said first named wheel to stop the same at zero, said second named wheel having a dog for engaging said movable member to hold said movable member with said detent in a position to stop said first named wheel in its zero position in its return movement, said second named wheel operating by the withdrawal of said dog, to permit a shifting movement of said movable member when said second named wheel rotates forwardly from its zero position, means for moving said movable member thereafter in a direction to follow said dog and shift said detent, thereby permitting continuous forward revolutions of said first named wheel, a stop device for arresting said measuring roller, said dog operating to move said movable member at the limit of the indicating movement of the machine, said movable member, when so moved, operating to actuate said stop device and arrest said measuring roller.

9. In a measuring and computing machine, the combination of a measuring roller mounted so as to be rotated by the goods passed through the machine, a wheel mounted to make successive revolutions, a second wheel driven so as to rotate at a slower rate than said first named wheel, means for driving said wheels by said measuring roller, indicating means controlled by said wheels, means for rotating said wheels backwardly to return the same to their zero position, a slide having a detent, a stop on said first named wheel to engage said detent, said second named wheel having a dog for engaging said slide to hold said slide with its detent in a position to engage said stop when said second named wheel is in its zero position and thereby hold said first named wheel in its zero position, said second named wheel operating by the withdrawal of said dog in its forward movement to permit a shifting movement of said slide, a spring for moving said slide thereafter in a direction to follow said dog and shift said detent, thereby permitting continuous forward revolutions of said first named wheel, a stop device for arresting said measuring roller, said dog operating to move said slide at the limit of the indicating movement of the machine, to actuate said stop device and arrest said measuring roller.

10. In a measuring and computing machine, the combination of a measuring roller mounted so as to be rotated by the goods passed through the machine, a wheel mounted to make successive revolutions, a second wheel 24 driven so as to rotate at a slower rate than said first named wheel, means for driving said wheels by said measuring roller, indicating means controlled by said wheels, means for rotating said wheels backwardly to return the same to their zero position, a slide having a detent, a stop on said first named wheel to engage said detent, said second named wheel having a dog, said slide having a projection engaged on one side by said dog to hold said slide with said detent in a position to engage said stop when said second named wheel is in its zero position, and thereby hold said first named wheel in its zero position, said second named wheel operating when rotated forwardly, to withdraw said dog from said projection to permit a shifting movement of said slide, a spring for moving said slide thereafter in a direction to follow said dog and shift said detent, thereby permitting continuous forward revolutions of said first named wheel, said dog operating thereafter at the limit of the indicating movement, to engage said projection on its opposite side to give said slide a further movement, and a stop device actuated by the said further movement of said slide to arrest said measuring roller.

11. In a measuring machine, the combination of a fixed scale, a web guided past said fixed scale, a take-up roller for winding up said web to advance the same past said scale, a measuring roller, means for rotating said take-up roller thereby, a wheel mounted to rotate with said measuring roller, a second wheel driven from said first named wheel through a partial revolution at each complete revolution of said first named wheel, said wheels having an interlocking driving connection for holding said second named wheel fixed against rotation during the intervals between the moments of complete revolution of said first named wheel, and a number wheel carried by said second named wheel for indicating the number of revolutions of said first named wheel, said web bearing numbers visible with corresponding numbers on said wheels to indicate the cost of a quantity of goods indicated by said wheels at the different prices per unit indicated on said fixed scale.

12. In a measuring machine, the combination of a fixed scale, a web bearing numbers and guided past said fixed scale, a take-up roller for winding up said web to advance the same past said scale, a measuring roller, means for rotating said take-up roller thereby, a wheel mounted to rotate at the same speed as said take-up roller, a second wheel, said wheels having a Geneva stop-movement connection operating to advance said second named wheel through a partial revolution at each complete revolution of said first named wheel, a number wheel carried by said second named wheel for indicating the number of revolutions of said first named wheel, means for rotating said take-up roller and said wheels backwardly to return the same to the zero position, a movable member having a detent coöperating with said first named wheel to stop the same in its zero position in its return movement, said second named wheel having means for controlling said movable member to cause said detent to move when said second named wheel rotates forwardly from its zero position to permit continuous forward revolutions of said first named wheel.

13. In a measuring machine, the combination of a fixed scale, a web guided past said fixed scale, a take-up roller and a drum upon which said web is wrapped for guiding and advancing the said web past said scale, a wheel mounted to rotate with said take-up roller and carrying numbers indicating fractions of a unit of measure, a second wheel driven from said first named wheel through a partial revolution at each complete revolution of said first named wheel and carrying numbers to indicate the number of complete revolutions of said first named wheel, a measuring roller, means for driving said wheels and said take-up roller from said measuring roller, said web bearing numbers visible with corresponding numbers on said wheels to indicate the cost of a quantity of goods indicated by said wheels at the different prices per unit indicated on said fixed scale, and means for rewinding the web upon said drum to return said web and said wheels to their zero position.

14. In a machine of the class described, the combination of a wheel mounted to make successive revolutions, a second wheel mounted to be rotated through a partial revolution at each revolution of said first named wheel, indicating means controlled by said wheel, a detent adjacent to said first named wheel and coöperating therewith to stop said first named wheel in its zero position, means for returning said wheels to their zero position and means for controlling said detent by said second named wheel to shift said detent and thereby permit successive forward revolutions of said first named wheel during the indicating movement.

15. In a machine of the class described, the combination of a wheel mounted to make successive revolutions, a second wheel mounted to be rotated through a partial revolution at each revolution of said first named wheel, indicating means controlled by said wheels, means for returning said wheels to their zero position, a movable member having a detent adjacent said first named wheel, said first named wheel having a coöperating part normally engaging said detent to hold said first named wheel in its zero position and means for controlling said movable member by said second named wheel to shift said detent out of the path of said coöperating part to permit successive forward revolutions of said first named wheel during the indicating movement.

In testimony whereof, I have hereunto set my hand.

WALTER E. HOSCH.